US012711344B2

(12) United States Patent
Latschbacher

(10) Patent No.: US 12,711,344 B2
(45) Date of Patent: Aug. 18, 2026

(54) MARKING ELEMENT

(71) Applicant: Latschbacher GmbH, Kronstorf (AT)

(72) Inventor: Klaus Latschbacher, Kronstorf (AT)

(73) Assignee: Latschbacher GmbH, Kronstrof (AT)

( * ) Notice: Subject to any disclaimer, the term of this patent is extended or adjusted under 35 U.S.C. 154(b) by 0 days.

(21) Appl. No.: 19/335,579

(22) Filed: Sep. 22, 2025

(65) Prior Publication Data

US 2026/0087298 A1 Mar. 26, 2026

(30) Foreign Application Priority Data

Sep. 24, 2024 (EP) .................................... 24202114

(51) Int. Cl.

| | |
|---|---|
| ***G09F 3/20*** | (2006.01) |
| ***A01G 23/099*** | (2006.01) |
| ***G06K 19/077*** | (2006.01) |
| ***G09F 3/04*** | (2006.01) |
| ***G09F 3/12*** | (2006.01) |

(52) U.S. Cl.

CPC ..... *G06K 19/07758* (2013.01); *A01G 23/099* (2013.01); *G09F 3/04* (2013.01); *G09F 3/12* (2013.01)

(58) Field of Classification Search

CPC .. G06K 19/07758; A01G 23/099; G09F 3/04; G09F 3/12

See application file for complete search history.

(56) References Cited

U.S. PATENT DOCUMENTS

| | | | | |
|---|---|---|---|---|
| 8,504,431 B2 * | 8/2013 | Huang | ................. | G06Q 10/087 705/28 |
| 2002/0170213 A1 | 11/2002 | Latschbacher et al. | | |
| 2006/0192677 A1 | 8/2006 | Huber | | |
| 2006/0266817 A1 * | 11/2006 | Leger | ..................... | G06Q 10/08 235/375 |

FOREIGN PATENT DOCUMENTS

| | | |
|---|---|---|
| EP | 1 246 152 | 10/2002 |
| EP | 4 258 168 | 10/2023 |
| FR | 2 982 689 | 5/2013 |
| FR | 2 996 332 | 4/2014 |

OTHER PUBLICATIONS

Search Report issued in corresponding European Patent Application No. 24202114.5, Feb. 11, 2025, 9 pages.

* cited by examiner

*Primary Examiner* — Jamara A Franklin
(74) *Attorney, Agent, or Firm* — HSML P.C.

(57) ABSTRACT

A marking element for tree trunks, with a base plate that has a striking surface and a cutting surface facing away from the striking surface. A cutting edge protrudes from the cutting surface and an electronic information carrier is attached to the base plate, which has a memory module and an antenna that is electrically connected to the memory module. The antenna has an antenna section which protrudes laterally beyond the striking surface and beyond the cutting surface.

15 Claims, 3 Drawing Sheets

MARKING ELEMENT

CROSS-REFERENCE TO RELATED APPLICATION

This application claims priority to European application no. 24202114.5 filed Sep. 24, 2024, which is incorporated by reference.

BACKGROUND

The invention relates to a marking element for tree trunks, with a base plate that has a striking surface and a cutting surface facing away from the striking surface, wherein a cutting edge protrudes from the cutting surface and wherein an electronic information carrier is attached to the base plate, which has a memory module and an antenna that is electrically connected to the memory module.

EP 1246152 A1 discloses a marking element for marking wood, in particular tree trunks, which has a plate-like marking body on which at least one fastening part is arranged for fastening the marking element to the wood to be marked. Furthermore, a transponder with a data memory for wireless data transmission is provided on the marking body for marking. This allows a large amount of data to be stored and read out wirelessly without the need for visual contact.

SUMMARY

The task of the invention is to provide a wirelessly readable marking element for tree trunks, which enables the memory module to be read even under difficult conditions.

This task is solved for a marking element of the type mentioned above in that the antenna having an antenna section that protrudes laterally beyond the striking surface and beyond the cutting surface. While in the marking element known from the prior art, a base area of the antenna is smaller than the base area of the marking body, in the marking element according to the invention, the antenna extends at least partially beyond the base plate. This increases the effective antenna area compared to the prior art, so that wireless communication between the marking element and a transmitting and reading device provided for reading the marking element can be reliably ensured even under difficult operating conditions. For example, the antenna area, which is larger than in the prior art, and the reduction of electromagnetic shielding of the antenna by the base plate facilitate the wireless coupling of energy provided by the transmitting and reading device to the antenna and thus to the electronic information carrier. Furthermore, the transmission of electromagnetic signals to be provided by the electronic information carrier to the transmitting and reading device is also improved.

These advantageous effects are achieved by the antenna being designed in such a way that, when projected onto a projection plane determined by the largest surface, in particular the striking surface, of the marking element, it is larger than the projection of this largest surface onto the projection plane in at least one spatial direction. By extending the at least one antenna section laterally beyond the striking surface and beyond the cutting surface, the antenna can be advantageously dimensioned, which is independent of the geometry of the base plate, at least within certain limits. For example, it is envisaged that the extension of the antenna in the projection plane is 1.2 to 1.7 times the extension of the base plate in the projection plane. If an antenna section is provided on only one side, it protrudes beyond the base plate by, for example, 20 to 150 percent of the extension of the base plate in the corresponding spatial direction. If antenna sections are provided on both sides, these protrude beyond the base plate by 10 to 100 percent of the extension of the base plate in the corresponding spatial direction.

In addition, the lateral protrusion of the antenna ensures that, when in use, i.e., when the marking element is attached to a cut surface of a tree trunk, the antenna is not shadowed by the base plate of the marking element, as is the case with the aforementioned prior art. This improves the contactless readout process for the marking element with the aid of a suitable transmitting and reading device.

Advantageous further developments of the invention are the subject of the subclaims.

It is advantageous if the information carrier comprises a carrier film, with the memory module and the antenna being applied to the carrier film (carrier foil, backing film). For example, the antenna is a thin, electrically conductive layer applied to the carrier film. Purely by way of example, the carrier film is designed as a plastic film onto which a metal film is applied, whereby the metal film is structured, for example, in a photolithographic process to form the antenna. Preferably, the antenna has electrical contact surfaces to which the memory module, which is designed in particular as a semiconductor element, can be electrically connected. For example, the memory module is electrically conductively attached, in particular glued, to one of the contact surfaces of the antenna and is electrically conductively connected to a second contact surface of the antenna via a wire bond connection. It is preferably provided that the electronic information carrier is designed to be flexible at least away from the memory module and can be bent or even kinked as required without impairing the function of the electronic information carrier. The memory module can also be designed as an integral part of the antenna, whereby the electrical function of the memory module can be realized, for example, by conductor track sections individually tailored to each information carrier. The memory module can be realized in analog circuit technology or in digital circuit technology or in a mixed design of analog and digital circuit technology.

It is preferable that the memory module and the antenna are arranged between the carrier film and a cover film. The cover film, which, like the carrier film, can be a plastic film, improves the robustness of the electronic information carrier both with regard to mechanical influences and with regard to chemical influences such as exposure to moisture. It is particularly preferred that the carrier film is connected to the cover film in at least some areas by a material bond, which can be ensured, for example, by gluing or welding the carrier film to the cover film.

In a further development of the invention, it is provided that a slit-shaped opening is formed at one edge area of the base plate and that the information carrier passes through the slit-shaped opening. The slit-shaped opening can be used to achieve a mechanical positive guide for the electronic information carrier, so that at least the antenna section that protrudes beyond the base plate is held in an advantageous spatial alignment with the base plate. This is particularly important when, in practical use of the marking element, it is intended to temporarily store a large number of marking elements in a stacked arrangement in a magazine, whereby it is accepted that the antenna sections of the marking elements will be at least elastically deformed. After removing the respective marking element from the magazine and driving the marking element into a cut surface of a tree trunk, the slit-shaped opening and the resulting positive guidance for the electronic information carrier ensure an advantageous alignment of the antenna section relative to the base plate and the tree trunk. The area of the antenna that is accommodated in the slit-shaped recess of the base plate also forms the beginning of the antenna section that protrudes laterally beyond the base plate.

In a further embodiment of the invention, the slit-shaped opening is designed as a recess with a continuous side wall in the base plate and frames a section of the information carrier. This geometry of the slit-shaped opening ensures that the information carrier cannot escape sideways from the slit-shaped opening, thereby ensuring particularly reliable positioning of the information carrier relative to the base plate.

Alternatively, the slit-shaped opening is designed as a laterally open recess in the base plate and surrounds a section of the information carrier in areas. Since this does not provide complete framing of the information carrier, it can be assumed that installation of the information carrier is easier compared to the slit-shaped opening designed as a recess.

It is advantageous if a groove is provided in the striking surface in which the information carrier is arranged, the depth of the groove being greater than the thickness of the information carrier. This groove ensures that no force is transmitted between the end face of a striking hammer and the information carrier when the marking element is struck. Instead, the impact force provided by the hammer is directed to the areas of the striking surface away from the groove, so that damage to the information carrier can be at least largely ruled out. The depth of the groove is determined by the distance between the base of the groove, where the information carrier is fixed, and the striking surface, and is greater than the thickness of the information carrier, i.e., the extent of the information carrier in the direction of the distance between the base of the groove and the striking surface.

In a further embodiment of the invention, a groove is provided in the cutting surface in which the information carrier is arranged, the depth of the groove being greater than the thickness of the information carrier. When a groove is made in the cutting surface and the information carrier is placed at the groove base of this groove, mechanical contact between the information carrier and the end face of the tree trunk, which is provided with the marking element, is prevented during intended use of the marking element. The depth of the groove is determined by the distance between the base of the groove, where the information carrier is fixed, and the cutting surface, and is greater than the thickness of the information carrier, i.e., the extension of the information carrier in the direction of the distance between the base of the groove and the cutting surface.

In an advantageous further development of the invention, it is provided that the antenna section forms an angle with the striking surface that is in the range between 10 degrees and 70 degrees. This ensures that, when the marking element is used as intended to mark a cut surface of a tree trunk, the antenna section also forms an angle with this cut surface that is greater than zero. This prevents the antenna section from sticking to the cut surface of the tree trunk, as could occur, for example, if the antenna section were aligned parallel to the striking surface, which could significantly reduce the electromagnetic interaction between the information carrier and a transmitting and reading device. Such an angled alignment of the antenna section relative to the cut surface of the tree trunk is particularly interesting when the conditions for a readout process are already difficult, for example due to rain, dirt, or snow.

It is preferred that several latching hooks protrude from the striking surface, which are designed for form-fitting attachment of the base plate to a striking hammer. With the aid of the latching hooks, the marking element is attached to a striking hammer prior to processing. For this purpose, a circumferential groove is provided on an outer circumferential surface of the striking hammer, into which the latching hooks can engage. It is preferable that a plurality of marking elements are stored in a stacked manner in a magazine prior to processing and that a single marking element can be removed from the magazine by form-fitting the latches to the striking hammer.

It is advantageous if a centering tip is formed on the cutting surface, which has a greater extension than the cutting edge in a cutting direction aligned transversely to the cutting surface, and if the information carrier is provided with a recess that can be penetrated by the centering tip. The function of the at least one centering tip is to ensure, when the marking element is used as intended, that the marking element is provisionally fixed to the cut surface of the tree trunk before the at least one cutting edge formed on the cutting surface engages with the cut surface of the tree trunk, thereby supporting advantageous alignment of the marking element relative to the tree trunk, so that the subsequent engagement of the cutting edge in the cut surface of the tree trunk takes place as precisely as possible in a spatial direction that corresponds to a cutting direction of the cutting edge. It is envisaged that the centering tip has a greater extension than the cutting edge in the cutting direction aligned perpendicular to the cutting surface, so that the centering tip engages with the cut surface of the tree trunk before the cutting edge during the impact process. It is particularly preferred that at least two cutting edges, in particular arranged mirror-inversely to each other, are arranged on the cutting surface and that the at least one centering tip is arranged centrally between the two cutting edges.

In a further embodiment of the invention, the memory module has two memory locations for storing different information. Each of the two memory locations can be designed to store a character string with several characters. It is preferred that one of the two memory locations stores an unchangeable character string that represents a unique identifier for the information carrier, and that the other of the two memory locations can store a character string that can be written to without contact, which is written, for example, during the assembly of the information carrier to the base plate and can be an application-specific character string.

It is advantageous if the information carrier is designed as an RFID tag (radio frequency identification tag). In this case, it is envisaged that a write and read device will provide electromagnetic waves that are tuned to the reception wavelength of the antenna of the electronic information carrier and that enable contactless energy coupling to the memory module via the antenna. This allows the information stored in the memory module to be transmitted contactless to the write and read device via the antenna.

It is preferably provided that the striking surface is designed as a flat surface and that the cutting surface is aligned parallel to the striking surface, at least in some areas. It is assumed here that the striking hammer has a flat front surface that rests on the striking surface and thus enables an effective impulse transmission to the marking element. Alternatively, it is envisaged that the striking surface has several surface areas that lie in a common plane and serve to transfer the impulse from the striking hammer to the marking element. This is particularly the case if the striking surface is provided with a groove that is designed to accommodate the information carrier.

In an advantageous invention, it is envisaged that the base plate is designed as a plastic injection-molded part. This enables the base plate to be manufactured cost-effectively. It is preferable for the information carrier to be fixed to the base plate in an automated assembly process. In particular, it may be provided that a plurality of strip-shaped information carriers is unwound from a roll as strip material and connected to the respective base plate in a combined welding and cutting process.

BRIEF DESCRIPTION OF THE DRAWINGS

Advantageous embodiments of the invention are shown in the drawing. Here shows.

DETAILED DESCRIPTION

Figures 1, 2, 3:
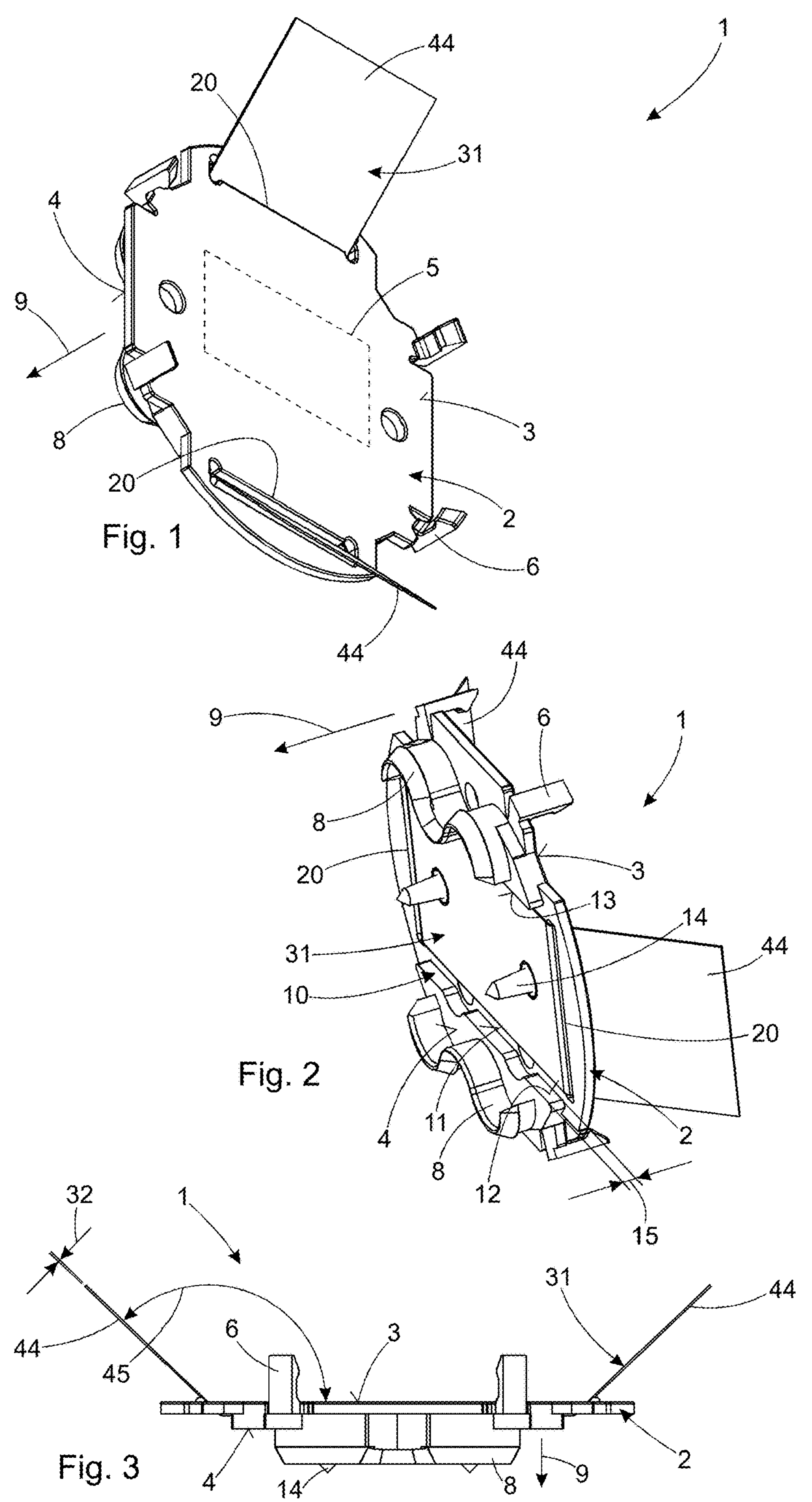
FIG. 1 a strictly schematic, perspective top view of a first embodiment of a marking element comprising a base plate and an information carrier attached thereto, FIG. 2 a strictly schematic, perspective view from below of the first embodiment of the marking element, FIG. 3 a strictly schematic side view of the first embodiment of the marking element, FIG. 4 a strictly schematic top view of the base plate of the first embodiment of the marking element, FIG. 5 a strictly schematic view from below of the base plate of the first embodiment of the marking element, FIG. 6 a strictly schematic, perspective top view of a second embodiment of a marking element comprising a base plate and an information carrier attached thereto, FIG. 7 a strictly schematic top view of the base plate of the second embodiment of the marking element, and FIG. 8 a strictly schematic top view of an information carrier.
Figure 4:
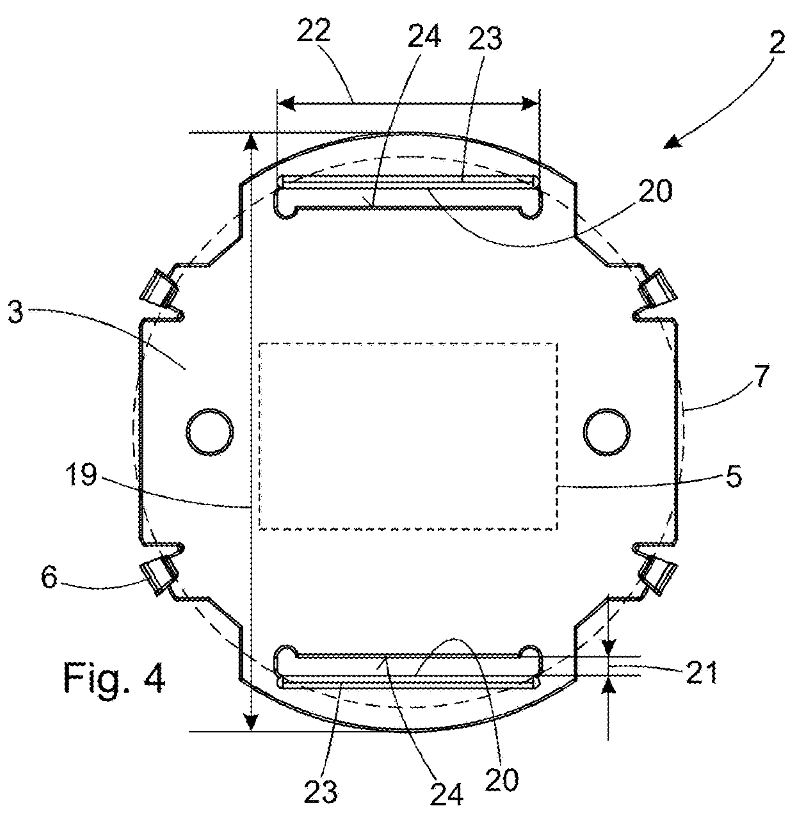
Figure 5:
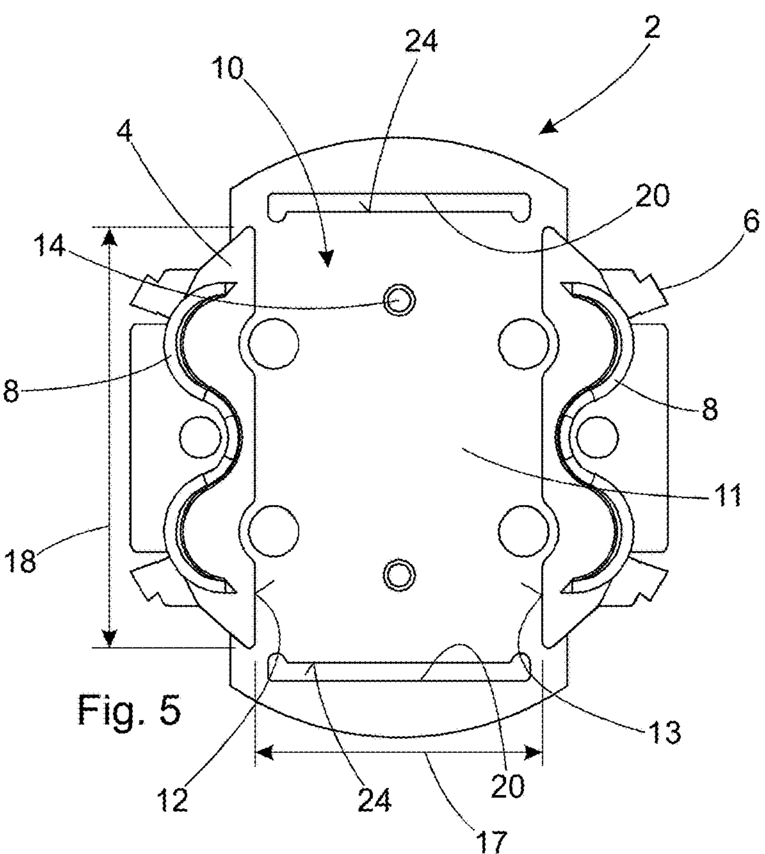
Figures 6, 7, 8:
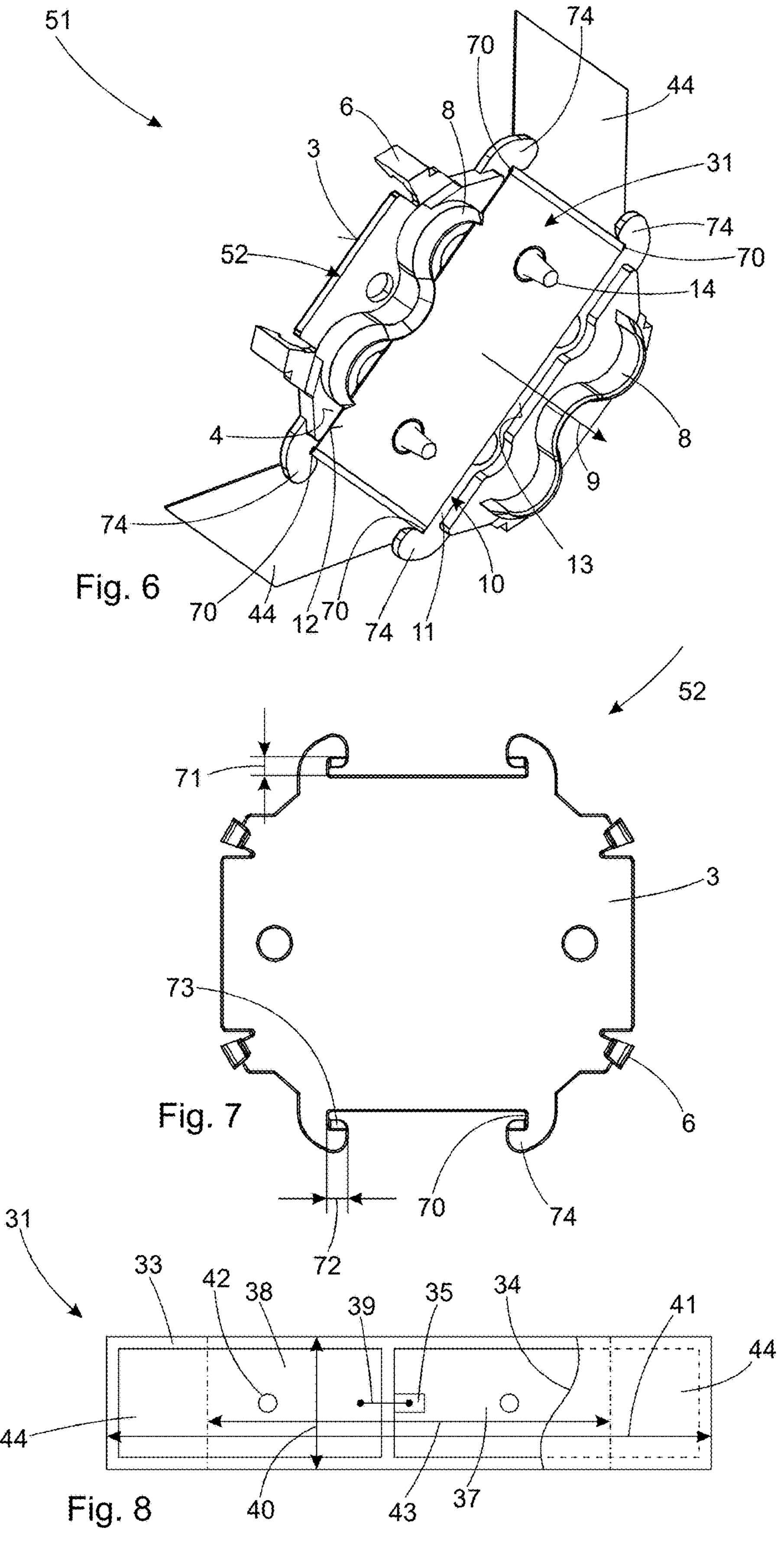

A first embodiment of a marking element 1 shown in different views in FIGS. 1 to 5 and a second embodiment of a marking element 51 shown in FIGS. 6 and 7 are each designed for marking tree trunks. For this purpose, it is intended that the respective marking element 1, 51 be attached to a cut surface of a tree trunk using a hammer (not shown). The marking element 1, 51 may be provided with a label that can be read directly by a user, for example a string of numbers and/or letters, which enables the tree trunk marked with the marking element 1, 51 to be identified. This label can be arranged in particular in a label field 5, which is shown purely as an example in FIGS. 1, 4, and 7.

The advantage of a label with an inscription that can be read directly by the user is that no additional technical equipment, such as a reader, is required to identify the respective tree trunk. However, considering the actual conditions under which tree trunks are handled and processed, it is obvious that the additional possibility of contactless reading of marking elements 1, 51 attached to tree trunks has considerable advantages over direct reading of a character string. For example, it can be assumed that the tree trunks felled in the forest are first provided with the marking elements 1, 51 after transport to a storage site, but then possibly remain at the storage site for a longer period of time, where the legibility of the marking is impaired by dirt or snowfall. Furthermore, both at the storage site and during subsequent transport of the tree trunks, a situation may arise in which not all end faces of tree trunks that have been provided with marking elements 1, 51 are directly accessible because they are covered by other tree trunks or in some other way, so that contactless reading of the marking elements 1, 51 is advantageous.

Accordingly, the marking elements 1, 51 are each provided with information carriers 31 in the manner described in more detail below, which are designed for contactless reading with a transmitter and reader device (not shown).

Since the two embodiments of marking elements 1, 51 differ only in terms of the mechanical guidance of the information carrier 31, but otherwise have the same structure, the following description is only for marking element 1, but is equally valid for marking element 51. The same reference symbols are used in all figures for components with the same function.

The marking element 1 comprises a base plate 2, preferably manufactured by plastic injection molding, and an information carrier 31 attached thereto, which is strip-shaped and formed from a film layer structure described in more detail below.

The base plate 2 provides all the functional areas required for the mechanical functionality of the marking element 1. For example, the base plate 2 has a flat striking surface 3, which serves for mechanical contact with the end face of a striking hammer (not shown) and for impulse transmission from this end face of the striking hammer to the marking element 1. Furthermore, an immediately visually readable inscription and/or a barcode and/or a QR code can be applied to the striking surface 3, in particular in the area of the inscription field 5, which is only shown schematically.

For example, a total of four latching hooks 6 protrude from the striking surface 3, each of which has a maximum extension in a spatial direction parallel to a surface normal (not shown) to the striking surface 3. Each of the tongue-shaped latching hooks 6 is provided at the end with a projection that protrudes approximately in the direction of an opposite latching hook 6, wherein the projections of the latching hooks 6 border a circle 7 that corresponds to the diameter of a circumferential groove in an outer circumference of the drive hammer (not shown). The locking hooks 6 are designed to ensure temporary form-fitting locking with the hammer.

On a cutting surface 4, which also can be called blade surface or bottom surface, which is formed on the base plate 2 and which faces away from the striking surface 3, two mirror-symmetrical, wave-shaped cutting edges 8 are provided, purely by way of example. The cutting edges 8 are tapered with increasing distance from the cutting surface 4 and, due to this tapering, determine a cutting direction 9 that is aligned parallel to a surface normal of the cutting surface 4 (not shown). Purely as an example, the cutting surface 4 is designed as a plane and is aligned parallel to the striking surface 3. Between the two cutting edges 8, a groove 10 is formed in the cutting surface 4, which defines a base surface 11. The base surface 11 is also referred to as the groove base and is flat shaped. The groove 10 is delimited by side walls 12, 13 aligned at right angles to the base surface 11.

Starting from the base surface 11, centering tips 14, which are tapered, in particular conical in shape, extend parallel to the cutting direction 9. The centering tips 14 protrude slightly beyond the cutting edges 8 in the cutting direction 9. This means that when the marking element 1 strikes an at least substantially flat cut surface of a tree trunk, it can be assumed that the centering tips 14 will initially come into contact with the cut surface, thereby providing advantageous preliminary fixation of the marking element 1 before the cutting edges 8 can penetrate the cut surface of the tree trunk in the cutting direction 9.

A depth 15 of the groove 10 is determined by a distance between the cutting surface 4 and the base surface 11 and is selected so that it is greater than a thickness 32 of the information carrier 31. Furthermore, it is provided that the information carrier 31 is fixed, preferably by a material bond, in particular by glueing, to the base surface 11 of the groove 10, so that it can be assumed that when the marking element 1 is attached to an at least substantially flat cut surface of a tree trunk, the cutting edges 8 stop penetrating the cut surface when the cutting surface 4 comes into contact with the cut surface. If this is the case and the cut surface of the tree trunk has no protrusions extending into the groove 10, a distance between the information carrier 31 and the cut surface, which is not shown in detail, is maintained, which is the difference between the depth 15 of the groove 10 and the thickness 32 of the information carrier 31. This means that it can be assumed that the information carrier 31 does not come into direct mechanical contact with the cut surface of the tree trunk and that the functionality of the information carrier 31 is therefore not compromised.

The strip-shaped information carrier 31 has, purely by way of example, a film layer structure consisting of a carrier film 33 and a cover film 34. In FIG. 8, the cover film 34 is shown partially cut off for explanation purposes. By way of example, it is envisaged that both the carrier film 33 and the cover film 34 are made of a flexible plastic material and are connected to each other in at least some areas by a material bond. Furthermore, it is envisaged that a memory chip 35 manufactured using semiconductor technology and an antenna 36, preferably made of metal foil and electrically connected to the memory chip 35, are arranged between the carrier film 33 and the cover film 34. For example, it is provided that the memory chip 35 is electrically conductively mounted on a first antenna area 37 and is electrically connected to a second antenna area 38 via a bond wire 39. The design of the antenna 36 according to FIG. 8 does not correspond to the actual design of the antenna, but serves only to illustrate a potential structure for the information carrier 31.

The width 40 of the information carrier 31 is smaller than the width 17 of the groove 10. The length 41 of the information carrier 31 is greater than the length 18 of the groove 10, so that the information carrier 31 protrudes laterally beyond the striking surface 3 and the cutting surface 4 of the base plate 2. For example, it is provided that the information carrier 31 protrudes beyond the base plate 2 on both sides and that the length 41 of the information carrier 31 is approximately 50 percent greater than an extension 19 of the base plate 2 in the direction of the groove 10.

Purely by way of example, it is provided that the information carrier 31 is provided with circular recesses 42 through which the centering tips 14 can protrude when the information carrier 31 is attached to the base surface 11 of the groove 10.

Furthermore, it is provided that the information carrier 31 rests flat against the base surface 11 of the groove 10 with a central section 43 and, purely by way of example, has antenna sections 44 bent at an acute angle 45 on both sides opposite the central section 43. For example, it is provided that the antenna sections 44 each form an angle 45 with the striking surface 3 of the base plate 2, which angle 45 is approximately 45 degrees. Due to the fact that the antenna sections 44 extend beyond the striking surface 3 starting from the arrangement of the central section 43 on the base surface 11 of the groove 10, it is ensured that, when the marking element 1 is used as intended, the antenna sections 44 do not come into mechanical contact with the cut surface of the tree trunk, thereby ensuring advantageous functionality for the antenna 36.

In order to permanently ensure this spatial alignment of the antenna sections 44 relative to the central section 43, a mechanical positive guide (forced guidance) for the strip-shaped information carrier 31 is provided on the base plate 2.

In the embodiment of the marking element 1 according to FIGS. 1 to 5, this forced guidance is achieved by slit-shaped openings 20 adjacent to the end of the groove 10, which are provided in the base plate 2. These slit-shaped openings 20 extend from the base surface 11 of the groove 10 to the striking surface 3. The width 22 of the slit-shaped opening 20 is greater than the width 40 of the information carrier 31. The length 21 of the slit-shaped opening 20 is greater than the thickness 32 of the information carrier 31. A transition between the slit-shaped opening 20 and the striking surface 3 is provided with a chamfer 23 on at least one side, so that the information carrier 31 can come into contact with an inclined surface defined by the chamfer 23. This reduces mechanical stress for the information carrier 31.

The slit-shaped opening 20 is a recess, i.e., a breakthrough in the base plate 2 with a completely closed side wall 24. This design of the slit-shaped opening 20 ensures that the information carrier 31 is securely held in place, preventing the antenna section 44 from slipping out during normal use of the marking element 1. However, this geometric design of the slit-shaped opening 20 requires an assembly process in which the information carrier 31 must be guided through the respective slit-shaped opening 20 at the same time as the respective antenna sections 44 are fixed to the base plate 2 by means of a material bond.

In the second embodiment of the marking element 51, as shown in FIGS. 6 and 7, the base plate 52 has, instead of the slit-shaped openings provided in the base plate 2, mirror-symmetrically arranged retaining hooks 74, each of which defines a guide slot 70 that is designed to accommodate an edge area of the information carrier 31. For example, it is provided that a length 71 of the guide slot 70 is greater than a thickness 32 of the information carrier 31. Furthermore, purely by way of example, it is provided that a width 72 of the guide slot 70 is approximately 10 percent of the width 40 of the information carrier 31.

An advantage of the design of the base plate 52 is that, when mounting the information carrier 31, the connection between the central section 43 of the information carrier 31 and the base surface 11 of the groove 10, which is in particular a material bond by glueing, can be created and, in a subsequent step, the antenna sections 44 can be threaded into the respective guide slots 70. This advantage in the assembly of the marking element 51 means that, even when the marking element 51 is used as intended, one or both of the antenna sections 44 can be unhooked from the retaining hooks 74, which can change the spatial alignment of the antenna sections 44 relative to the central section 43. This problem can be counteracted by preforming the information carrier 31 prior to mounting on the base plate 52 by plastic deformation (bending) in such a way that even unhooking the information carrier 31 from the retaining hooks 74 does not lead to a significant change in the spatial shape of the information carrier 31.

The invention claimed is:

1. A marking element for tree trunks, with a base plate that has a striking surface and a cutting surface facing away from the striking surface, wherein a cutting edge protrudes from the cutting surface and wherein an electronic information carrier is attached to the base plate, which has a memory module and an antenna that is electrically connected to the memory module, wherein the antenna has an antenna section which protrudes laterally beyond the striking surface and beyond the cutting surface.

2. The marking element according to claim 1, wherein the information carrier comprises a carrier film, wherein the memory module and the antenna are applied to the carrier film.

3. The marking element according to claim 2, wherein the memory chip and the antenna are arranged between the carrier film and a cover film.

4. The marking element according to claim 1, wherein a slit-shaped opening is formed at an edge region of the base plate and wherein the information carrier passes through the slit-shaped opening.

5. The marking element according to claim 4, wherein the slit-shaped opening is formed as a recess with a continuous side wall in the base plate and frames a section of the information carrier.

6. The marking element according to claim 4, wherein the slit-shaped opening is formed as a laterally open recess in the base plate and partially surrounds a section of the information carrier.

7. The marking element according to claim 1, wherein a groove is formed in the striking surface, in which the information carrier is arranged, wherein a depth of the groove is greater than a thickness of the information carrier.

8. The marking element according to claim 1, wherein a groove is formed in the cutting surface, in which the information carrier is arranged, wherein a depth of the groove is greater than a thickness of the information carrier.

9. The marking element according to claim 1, wherein the antenna section forms an angle with the striking surface which is in the range between 10 degrees and 70 degrees.

10. The marking element according to claim 1, wherein several latching hooks protrude from the striking surface, which are designed for form-fitting fastening of the base plate to a striking hammer.

11. The marking element according to claim 1, wherein a centering tip is formed on the cutting surface which, in a cutting direction aligned transversely to the cutting surface, has a greater extension than the cutting edge, and wherein the information carrier is provided with a recess which can be penetrated by the centering tip.

12. The marking element according to claim 1, wherein the memory module has two memory locations for storing different information.

13. The marking element according to claim 1, wherein the information carrier is designed as an RFID.

14. The marking element according to claim 1, wherein the striking surface is designed as a flat surface, and the cutting surface is at least partially aligned parallel to the striking surface.

15. The marking element according to claim 1, wherein the base plate is designed as a plastic injection molded part.

* * * * *